United States Patent
Ando (10) Patent No.: US 12,459,510 B2
(45) Date of Patent: Nov. 4, 2025

(54) VEHICLE CONTROL APPARATUS

(71) Applicant: SUBARU CORPORATION, Tokyo (JP)

(72) Inventor: Yusuke Ando, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 203 days.

(21) Appl. No.: 18/228,744

(22) Filed: Aug. 1, 2023

(65) Prior Publication Data
US 2024/0051535 A1    Feb. 15, 2024

(30) Foreign Application Priority Data
Aug. 9, 2022  (JP) .................. 2022-127122

(51) Int. Cl.
  *B60W 30/16*    (2020.01)
  *B60W 30/18*    (2012.01)
  *B60W 40/105*   (2012.01)

(52) U.S. Cl.
  CPC ...... *B60W 30/16* (2013.01); *B60W 30/18109* (2013.01); *B60W 40/105* (2013.01);
  (Continued)

(58) Field of Classification Search
  CPC ........... B60W 30/16; B60W 30/18109; B60W 40/105; B60W 2520/00; B60W 2552/20;
  (Continued)

(56) References Cited

U.S. PATENT DOCUMENTS

| | | | |
|---|---|---|---|
| 6,405,132 B1 * | 6/2002 | Breed | G08G 1/161 701/45 |
| 2005/0060069 A1 * | 3/2005 | Breed | B60W 40/06 701/408 |

(Continued)

FOREIGN PATENT DOCUMENTS

| | | | | |
|---|---|---|---|---|
| JP | 2017-117192 A | 6/2017 | | |
| KR | 0174048 B1 * | 2/1999 | ........... | B60W 40/02 |

(Continued)

OTHER PUBLICATIONS

KR_0174048_B1_I_translation (Year: 1999).*
WO_2023110343_A1_I_translation (Year: 2023).*

*Primary Examiner* — Kyle T Johnson
(74) *Attorney, Agent, or Firm* — TROUTMAN PEPPER LOCKE LLP (57) ABSTRACT

A vehicle control apparatus is to be applied to a vehicle. The vehicle control apparatus includes one or more processors. The one or more processors configured to function as a target object detector, a road state detector, a speed calculator, and a braking controller. The target object detector is configured to detect a target object in front of the vehicle. The road state detector is configured to detect a road state of a road in front of the vehicle. The speed calculator is configured to calculate a non-stuck speed at which the vehicle does not become stuck on the road in front of the vehicle, when the target object is detected, the road in front of the vehicle is an uphill slope, and a road surface of the road satisfies a predetermined condition. The braking controller is configured to brake the vehicle to the non-stuck speed.

5 Claims, 4 Drawing Sheets

(52) U.S. Cl.
CPC ..... *B60W 2520/00* (2013.01); *B60W 2552/20* (2020.02); *B60W 2554/80* (2020.02)

(58) Field of Classification Search
CPC ......... B60W 2554/80; B60W 2552/40; B60W 2555/20; B60W 2720/10; B60W 2552/15
See application file for complete search history.

(56) References Cited

U.S. PATENT DOCUMENTS

| | | | | |
|---|---|---|---|---|
| 2005/0134440 | A1* | 6/2005 | Breed | G08G 1/161 701/45 |
| 2008/0140318 | A1* | 6/2008 | Breed | G08G 1/167 702/3 |
| 2009/0062987 | A1* | 3/2009 | Kim | B60W 30/09 701/41 |
| 2015/0353095 | A1* | 12/2015 | Freess | B60W 10/18 701/1 |
| 2021/0001854 | A1* | 1/2021 | Niewiadomski | B60W 10/04 |
| 2022/0185285 | A1* | 6/2022 | Niewiadomski | B60W 10/18 |
| 2023/0138981 | A1* | 5/2023 | Willoughby | B60W 30/12 701/26 |
| 2023/0191918 | A1* | 6/2023 | Usui | B60W 30/146 701/22 |
| 2023/0202451 | A1* | 6/2023 | Ishii | G05D 1/0214 701/36 |
| 2024/0051535 | A1* | 2/2024 | Ando | B60W 40/105 |
| 2024/0157967 | A1* | 5/2024 | Yokota | B60W 10/18 |
| 2024/0416920 | A1* | 12/2024 | Kang | B60W 40/068 |
| 2025/0033645 | A1* | 1/2025 | Kang | B60W 50/14 |

FOREIGN PATENT DOCUMENTS

| | | | | |
|---|---|---|---|---|
| WO | WO-0054008 | A1 * | 9/2000 | ............ B60N 2/002 |
| WO | WO-2015075519 | A2 * | 5/2015 | ............ B60W 30/16 |
| WO | WO-2023110343 | A1 * | 6/2023 | ............ A01B 76/00 |

* cited by examiner

VEHICLE CONTROL APPARATUS

CROSS-REFERENCE TO RELATED APPLICATION

The present application claims priority from Japanese Patent Application No. 2022-127122 filed on Aug. 9, 2022, the entire contents of which are hereby incorporated by reference.

BACKGROUND

The disclosure relates to a vehicle control apparatus to be mounted on a vehicle.

For example, Japanese Unexamined Patent Application Publication (JP-A) No. 2017-117192 proposes a vehicle control apparatus that performs a contact damage reduction braking control (AEB: Autonomous Emergency Braking). The vehicle control apparatus so brakes a vehicle that a relative speed between the vehicle and an object in front of the vehicle becomes 0 (zero).

SUMMARY

An aspect of the disclosure provides a vehicle control apparatus to be applied to a vehicle. The vehicle control apparatus includes one or more processors. The one or more processors configured to function as a target object detector, a road state detector, a speed calculator, and a braking controller. The target object detector is configured to detect a target object in front of the vehicle. The road state detector is configured to detect a road state of a road in front of the vehicle. The speed calculator is configured to calculate a non-stuck speed at which the vehicle does not become stuck on the road in front of the vehicle, when the target object is detected by the target object detector, the road in front of the vehicle detected by the road state detector is an uphill slope, and a road surface of the road detected by the road state detector satisfies a predetermined condition. The braking controller is configured to brake the vehicle to the non-stuck speed.

An aspect of the disclosure provides a vehicle control apparatus to be applied to a vehicle. The vehicle control apparatus includes circuitry configured to: detect a target object in front of the vehicle; detect a road state in front of the vehicle; calculate a non-stuck speed at which the vehicle does not become stuck on a road in front of the vehicle, when the target object is detected, the road in front of the vehicle comprises an uphill slope, and a road surface of the road satisfies a predetermined condition; and brake the vehicle to the non-stuck speed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

A vehicle control apparatus, such as that disclosed in JP-A No. 2017-117192, so brakes a vehicle that a speed becomes 0 (zero) when an object in front of the vehicle is a stationary object. Under such circumstances, if the vehicle control apparatus stops the vehicle on a road having an uphill slope in a snow-covered state or a frozen state, wheels of the vehicle can slip upon a start of the vehicle and the vehicle can become stuck.

It is desirable to provide a vehicle control apparatus that makes it possible to reduce a situation in which a vehicle becomes stuck as a result of braking the vehicle.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Figure 1:
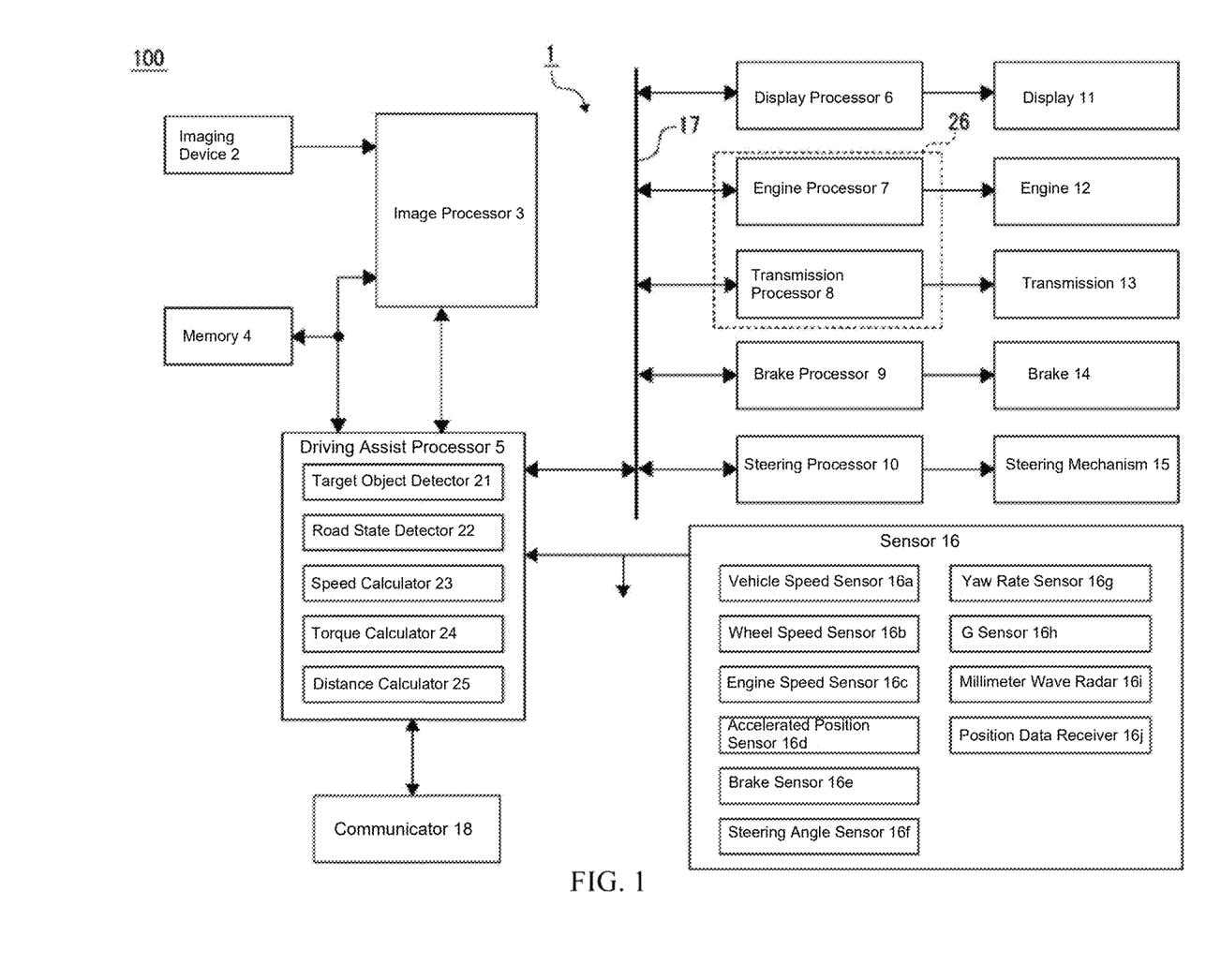
FIG. 1 is a diagram illustrating a configuration of a vehicle control apparatus according to one example embodiment of the disclosure.

FIG. 1 is a diagram illustrating a configuration of a vehicle control apparatus 1 according to an example embodiment of the disclosure. Referring to FIG. 1, a vehicle 100 may include the vehicle control apparatus 1. The vehicle control apparatus 1 is to be mounted on the vehicle 100 and may control the vehicle 100.

The vehicle control apparatus 1 may include an imaging device 2, an image processor 3, a memory 4, a driving assist processor 5, a display processor 6, an engine processor 7, a transmission processor 8, a brake processor 9, a steering processor 10, a display 11, an engine 12, a transmission 13, a brake 14, a steering mechanism 15, a sensor 16, a bus 17, and a communicator 18.

The driving assist processor 5, the display processor 6, the engine processor 7, the transmission processor 8, the brake processor 9, and the steering processor 10 may be coupled to each other via the bus 17.

One or more of the image processor 3, the driving assist processor 5, the display processor 6, the engine processor 7, the transmission processor 8, the brake processor 9, and the steering processor 10 may be or may include a microcomputer. The microcomputer may have devices including, for example, CPU (Central Processing Unit), ROM (Read Only Memory), and RAM (Random Access Memory). In one embodiment, the CPU may serve as a "processor". In one embodiment, one or more of the image processor 3, the driving assist processor 5, the display processor 6, the engine processor 7, the transmission processor 8, the brake processor 9, and the steering processor 10 may serve as the "processor".

The imaging device 2 may be, for example, a stereo camera. The imaging device 2 may include two cameras that capture images in substantially the same direction. Each of the cameras may be so provided that a distance measurement by a so-called stereo imaging method is performable.

The cameras each may include a camera optical system and an image sensor. The image sensor may be any imaging element such as CCD (Charge Coupled Device) or CMOS (Complementary Metal Oxide Semiconductor). Each of the cameras may form an image of a subject on an imaging surface of an imaging element via the camera optical system, and obtain an electric signal corresponding to an amount of received light obtained in each pixel of the imaging element. The electric signals obtained by the respective cameras may be subjected to an analog to digital (A/D) conversion and a predetermined correction process, and may be supplied to the image processor 3 as digital image signals (image data) that represent luminance values based on predetermined gradations on a pixel-by-pixel basis.

In some embodiments, the imaging device 2 may be a single camera including a distance-measurable imaging element. The imaging device 2 may include a camera such as a camera that captures an image of the front of the vehicle 100, a camera that captures an image of the rear of the vehicle 100, or a camera that captures an image of the side of the vehicle 100.

The image processor 3 may execute a predetermined image process related to recognition of an environment outside the vehicle 100, based on the image data obtained by the imaging device 2. The image process by the image processor 3 may be performed based on the memory 4. The memory 4 may be, for example, a nonvolatile memory.

The image processor 3 may execute various image processes that are based on the image data obtained by the stereo imaging, and recognize, for example, a three-dimensional object and a lane line in front of the vehicle 100. The lane line may be a line such as a center line or a lane boundary line. The image processor 3 may recognize a road or a lane (an own vehicle traveling road) on which the vehicle 100 travels, based on the recognized three-dimensional object, for example. The image processor 3 may recognize a preceding vehicle as a target to follow, based on the recognized three-dimensional object, for example.

For example, the image processor 3 may generate distance data for each pixel, based on the principle of triangulation and on an amount of deviation (a parallax) of corresponding positions in the pair of captured images as the image data. The image processor 3 may perform a known grouping process on the distance data, and compare the distance data having been subjected to the grouping process with data stored in advance, such as three-dimensional road shape data or three-dimensional object data. Thus, the image processor 3 may recognize: a lane line such as a white line; a guardrail; a side wall such as a curbstone; a three-dimensional object such as a vehicle; a stop line; a traffic signal; a railroad crossing; a crosswalk; a lane; or any other recognizable object.

The image processor 3 may thus recognize the surrounding object and recognize a behavior of the recognized surrounding object as well, based on the image data. For example, the image processor 3 may recognize: a position; a speed; an acceleration rate such as a plus or minus acceleration rate based on acceleration or deceleration; a change in a traveling direction; or a blinking of a blinker, of the preceding vehicle with respect to the vehicle 100 as a reference.

The image processor 3 may recognize the pieces of data of the various external environments as described above, for example, for each frame of the image data, and sequentially store the recognized data in the memory 4 or cause the memory 4 to hold the recognized data.

The memory 4 may contain, in addition to a result of the image process performed by the image processor 3, data such as map data including data on a road gradient.

The driving assist processor 5 may execute various driving assist controls directed to a driving assist, based on: the result of the image process by the image processor 3 held in the memory 4; a detection signal obtained by the sensor 16; operation input data, etc.; and communication data obtained by the communicator 18.

The driving assist processor 5 may instruct a necessary processor among the display processor 6, the engine processor 7, the transmission processor 8, the brake processor 9, and the steering processor 10 to execute an operation related to the driving assist.

Non-limiting examples of the driving assist control to be executed by the driving assist processor 5 may include: a lane keep control; a contact damage reduction braking control (AEB: Autonomous Emergency Braking); a cruise control with an inter-vehicle distance control (ACC: Adaptive Cruise Control); and a preceding vehicle following steering control. The lane keep control, the autonomous emergency braking, the adaptive cruise control, and the preceding vehicle following steering control each may be achieved by a known method, and thus description thereof will not be provided in detail.

The display processor 6 may control a display operation to be performed by the display 11, based on, for example, the detection signal from the sensor 16, the operation input data from an operation member, or instructions from the driving assist processor 5. For example, the display processor 6 may display a predetermined alert message on the display 11 as a part of the driving assist, based on the instructions from the driving assist processor 5.

The display 11 may be: various meters provided in a meter panel installed in front of a driver who drives the vehicle 100, such as a speedometer or a tachometer; MFD (Multi-Function Display); or a display device that presents information to the driver. The MFD may display, simultaneously or in a switched manner, various types of information such as: a total traveling distance; an outside air temperature; or an instantaneous fuel consumption, of the own vehicle.

The engine processor 7 may control the engine 12, based on, for example, the detection signal from the sensor 16, the operation input data from the operation member, or the instructions from the driving assist processor 5.

For example, the engine processor 7 may perform a start control and a stop control of the engine 12 in response to an operation of an ignition switch. The engine processor 7 may control, for example, a fuel injection timing, a fuel injection amount, or a throttle position, based on a detection signal from a predetermined sensor such as an engine speed sensor 16c or an accelerator position sensor 16d which will be described later.

The transmission processor 8 may control the transmission 13, based on, for example, the detection signal from the sensor 16, the operation input data from the operation member, or the instructions from the driving assist processor 5.

For example, the transmission processor 8 may output a predetermined shift signal to the transmission 13 to perform a shift control.

The brake processor 9 may control the brake 14, based on, for example, the detection signal from the sensor 16, the operation input data from the operation member, or the instructions from the driving assist processor 5.

For example, the brake processor 9 may control a hydraulic pressure of the brake 14 to brake the vehicle 100, based on the instruction data outputted from the driving assist processor 5. The brake processor 9 may calculate a slip rate of wheels of the vehicle 100, based on a detection signal of a predetermined sensor such as a rotational speed sensor of an axle or a vehicle speed sensor 16a, and perform a so-called ABS (Antilock Brake System) control by increasing or decreasing the hydraulic pressure of the brake 14 in response to the slip rate.

The steering processor 10 may control the steering mechanism 15, based on the detection signal from the sensor 16, the operation input data from the operation member, or the instructions from the driving assist processor 5.

For example, the steering processor 10 may control the steering mechanism 15, based on a steering angle detected by a later-described steering angle sensor 16f to steer steered wheels. The steering processor 10 may achieve automatic steering by controlling the steering mechanism 15, based on the instruction data given from the driving assist processor 5.

The sensor 16 may be various sensors provided in the vehicle 100. Non-limiting examples of the sensor 16 may include the vehicle speed sensor 16a, a wheel speed sensor 16b, the engine speed sensor 16c, the accelerator position sensor 16d, a brake sensor 16e, the steering angle sensor 16f, a yaw rate sensor 16g, a G sensor 16h, a millimeter-wave radar 16i, and a position data receiver 16j. It should be noted that these devices are merely examples, and the vehicle 100 may include various sensors other than those described above.

The vehicle speed sensor 16a may detect a speed, or a vehicle speed, of the vehicle 100.

The wheel speed sensor 16b may detect a rotational speed of a wheel.

The engine speed sensor 16c may detect a rotational speed of the engine 12.

The accelerator position sensor 16d may detect an accelerator position, based on an amount of pressing of an accelerator pedal.

The brake sensor 16e may detect a brake operating amount, based on an amount of pressing of a brake pedal.

The steering angle sensor 16f may detect the steering angle of a steering wheel.

The yaw rate sensor 16g may detect a yaw rate applied to the vehicle 100.

The G sensor 16h may detect acceleration rates that act in a traveling direction, a vehicle widthwise direction, and a vertical direction of the vehicle 100.

The millimeter-wave radar 16i may detect a surrounding situation of the vehicle 100 by emitting millimeter waves toward the outside and performing sensing.

The position data receiver 16j may be, for example, a receiver directed to Global Satellite Navigation System (GNSS) or a receiver that receives data from a roadside device, and acquire data on a current position of the vehicle 100.

The sensor 16 may supply various detection signals to any of processors including the image processor 3, the driving assist processor 5, the display processor 6, the engine processor 7, the transmission processor 8, the brake processor 9, and the steering processor 10.

The communicator 18 may perform an inter-vehicle communication and a network communication. The driving assist processor 5 may acquire data of another vehicle received by the communicator 18. The communicator 18 may acquire various kinds of data, such as surrounding environment data of a current location or road data of the current location, through the network communication such as the Internet.

An example of a vehicle braking control according to the example embodiment will be described. The vehicle braking control may brake the vehicle 100 to a speed at which the vehicle 100 does not become stuck, when an obstacle is present in front of the vehicle 100 or on a traveling lane of the vehicle 100 and the vehicle 100 travels on an uphill road in a snow-covered state or a frozen state. In some embodiments, the vehicle braking control may be an example of the contact damage reduction brake control (AEB) described above.

The driving assist processor 5 may serve as a target object detector 21, a road state detector 22, a speed calculator 23, a torque calculator 24, and a distance calculator 25 upon performing the vehicle braking control. The engine processor 7 and the transmission processor 8 may serve as a drive processor 26 upon performing the vehicle braking control.

Figure 2:
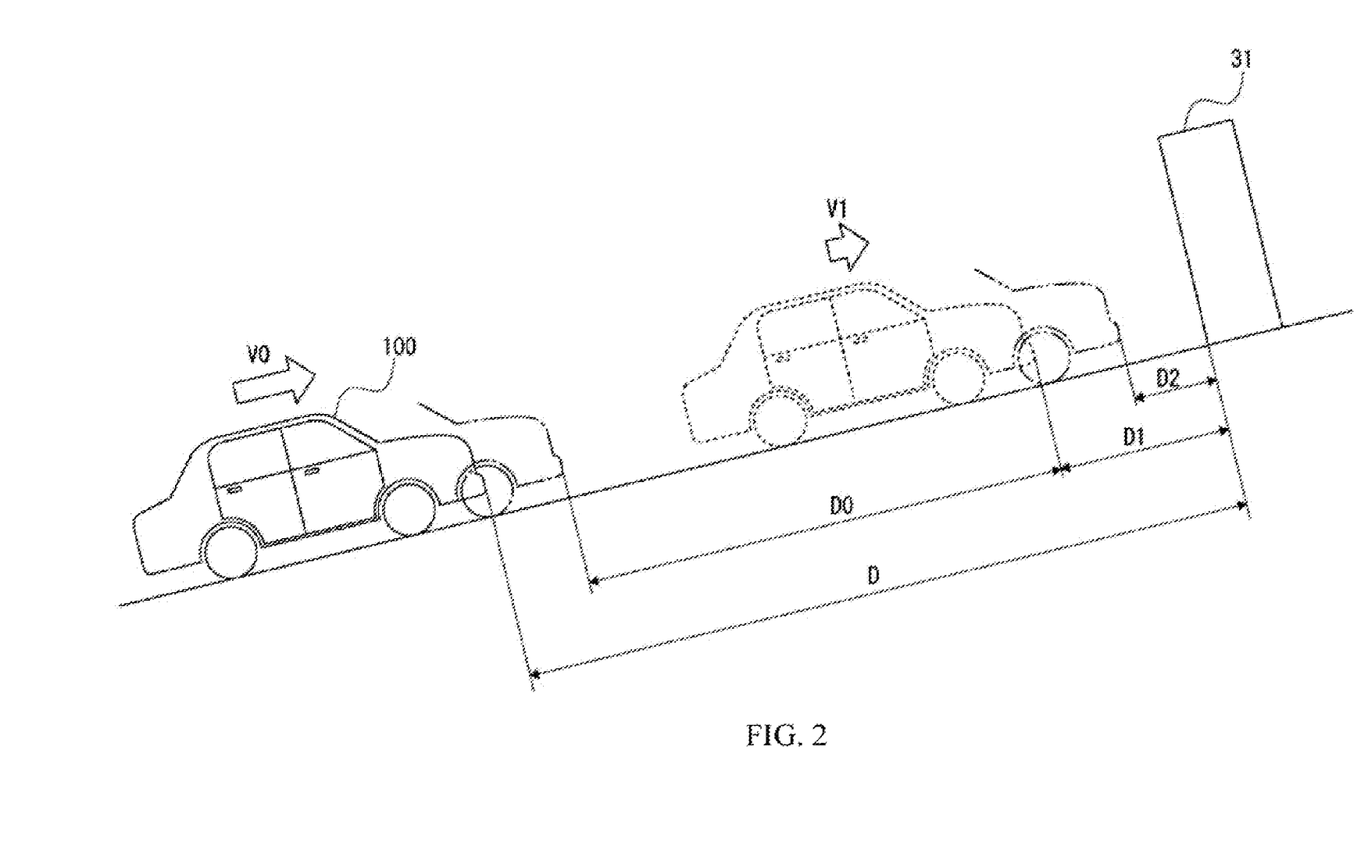
FIG. 2 is a diagram illustrating an example of a vehicle braking control.
Figure 3:
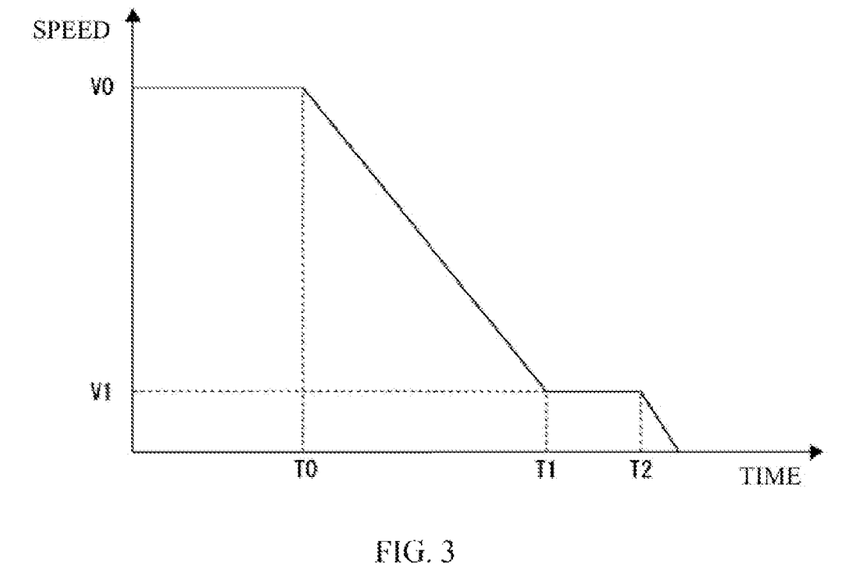
FIG. 3 is a graph illustrating a relationship between time and a speed upon the vehicle braking control.

FIG. 2 illustrates an example of the vehicle braking control. FIG. 3 illustrates a relationship between time and a speed upon the vehicle braking control.

Referring to FIG. 2, the target object detector 21 may detect, as a target object 31, an object on which the vehicle braking control is to be performed. For example, the target object detector 21 may detect, as the target object 31, a stationary object on the traveling lane of the vehicle 100, among the three-dimensional objects recognized by the image processor 3.

In some embodiments, the target object detector 21 may detect the target object 31, based on a result of the detection performed by the millimeter-wave radar 16i.

The road state detector 22 may detect a road state in front of the vehicle 100. In some embodiments, the road state detector 22 may detect or calculate a road gradient and a road surface state as the road state in front of the vehicle 100.

For example, the road state detector 22 may calculate the road gradient in front of the vehicle 100, based on: an inclination of the vehicle 100 that is based on the acceleration rates detected by the G sensor 16h; and the distance data of the road or the traveling lane in front of the vehicle 100 detected by the image processor 3.

The road state detector 22 may refer to the map data and determine a position in front of the vehicle 100 on the map, based on the current position of the vehicle 100 acquired by the position data receiver 16j and the distance from the vehicle 100 to the target object 31. The road state detector 22 may thereafter read, from the map data, the road gradient at the determined position.

It should be noted that the road state detector 22 may detect the road gradient by any other method other than that described above.

The road state detector 22 may detect the road surface state of the road on which the vehicle 100 travels, based on a color of the road in front of the vehicle 100 which is captured in the captured image derived from the image data, or the road data acquired from the communicator 18. In some embodiments, the road state detector 22 may detect whether the road surface state is the snow-covered state or the frozen state. For example, when the color of the road in front of the vehicle 100 captured in the captured image is white, the road state detector 22 may determine that the road surface state is the snow-covered state.

In some embodiments, the road state detector 22 may detect the road surface state, based on the slip rate calculated by the brake processor 9.

It should be noted that the road state detector 22 may detect the road surface state by any other method other than that described above.

The driving assist processor 5 may determine that the vehicle 100 can become stuck upon restarting when the vehicle 100 is stopped, when: the target object 31 is present in front of the vehicle 100; the road in front of the vehicle 100 is an uphill slope; and the road surface state is the snow-covered state or the frozen state.

In such a case, the speed calculator 23 may refer to a speed map and calculate a non-stuck speed V1 at which the vehicle 100 does not become stuck even when the vehicle 100 starts or accelerates on the road in front of the vehicle 100, based on the road gradient and the road state in front of the vehicle 100. The speed map may be a two-dimensional map in which the non-stuck speed V1 is associated with the road surface gradient and the road state. As used herein, the term "non-stuck speed V1" may encompass the speed at which the vehicle 100 does not become stuck when the vehicle 100 starts or accelerates, and may also encompass a speed at which a possibility of the vehicle 100 becoming stuck is low when the vehicle 100 starts or accelerates.

The torque calculator 24 may calculate, as a drive torque Tq, a torque necessary to be outputted from the engine 12 and the transmission 13 in order for the vehicle 100 to maintain the non-stuck speed V1 in the calculated road gradient. The engine 12 and the transmission 13 may be hereinafter collectively referred to as a "drive unit". In one embodiment, the engine 12 and the transmission 13 may serve as the "drive unit". In some embodiments, the torque calculator 24 may calculate the drive torque Tq, based on the non-stuck speed V1 and the road gradient.

The distance calculator 25 may calculate, as a braking possible distance D1, a distance to the target object 31 at which the vehicle 100 is stoppable without causing the vehicle 100 to come into contact with the target object 31 by the driver's operation of the brake pedal when the vehicle 100 travels at the non-stuck speed V1. Here, a time necessary for the driver to operate the brake pedal after finding the target object 31 may be set in advance as an operation necessary time.

In some embodiments, the distance calculator 25 may calculate the braking possible distance D1 by multiplying the non-stuck speed V1 by the operation necessary time.

The distance calculator 25 may calculate a braking start distance D0 necessary to decelerate the vehicle 100 from a speed V0 to the non-stuck speed V1, based on: the current speed V0 of the vehicle 100 detected by the vehicle speed sensor 16a; the non-stuck speed V1 calculated by the speed calculator 23; and a predetermined deceleration rate or the minus acceleration rate.

The brake processor 9 may so control the brake 14 that the predetermined deceleration rate is achieved to brake the vehicle 100, at a timing T0 at which a distance D from the vehicle 100 to the target object 31 becomes the sum of the braking start distance D0 and the braking possible distance D1. In FIG. 2, the timing T0 corresponds to a position where the vehicle 100 is indicated by a dashed-dotted line.

This configuration helps to decelerate the vehicle 100 to the non-stuck speed V1 at a timing T1 at which the distance D from the vehicle 100 to the target object 31 becomes the braking possible distance D1. In FIG. 2, the timing T1 corresponds to a position where the vehicle 100 is indicated by a broken line.

The drive processor 26 may so control, on an as-necessary basis, the engine 12 and the transmission 13 that the torque to be outputted from the drive unit is maintained at the drive torque Tq.

This allows the vehicle 100 to approach the target object 31 while maintaining the non-stuck speed V1.

As described above, the vehicle 100 may be decelerated to the non-stuck speed V1. This configuration helps to reduce a situation in which the wheels of the vehicle 100 spin out and the vehicle 100 becomes stuck, when the driver operates the accelerator pedal to accelerate the vehicle 100 while the vehicle 100 travels at the non-stuck speed V1.

However, if the driver does not perform any operation such as an operation of the accelerator pedal or the brake pedal while the vehicle 100 travels at the non-stuck speed V1, the vehicle 100 can come into contact with the target object 31.

Accordingly, in some embodiments, when the vehicle 100 decelerates to the non-stuck speed V1, that is, when the distance from the vehicle 100 to the target object 31 becomes the braking possible distance D1, the distance calculator 25 may calculate a braking start distance D2 that is necessary to cause the speed of the vehicle 100 to be 0 (zero) before the vehicle 100 comes into contact with the target object 31, based on: the non-stuck speed V1 (i.e., the current speed) and the predetermined deceleration rate.

The brake processor 9 may so control the brake 14 that the predetermined deceleration rate is achieved to brake the vehicle 100, at a timing T2 at which the distance D from the vehicle 100 to the target object 31 becomes the braking start distance D2. In FIG. 2, the timing T2 corresponds to a position where the vehicle 100 is indicated by a two-dot chain line.

Thus, the vehicle control apparatus 1 helps to stop the vehicle 100 before the vehicle 100 comes into contact with the target object 31.

In some embodiments, when the driver performs a predetermined operation such as the operation of the accelerator pedal or the brake pedal while the vehicle braking control is performed, the driving assist processor 5 may end the vehicle braking control to switch to a control of the vehicle 100 that is based on the driver's predetermined operation.

Figure 4:
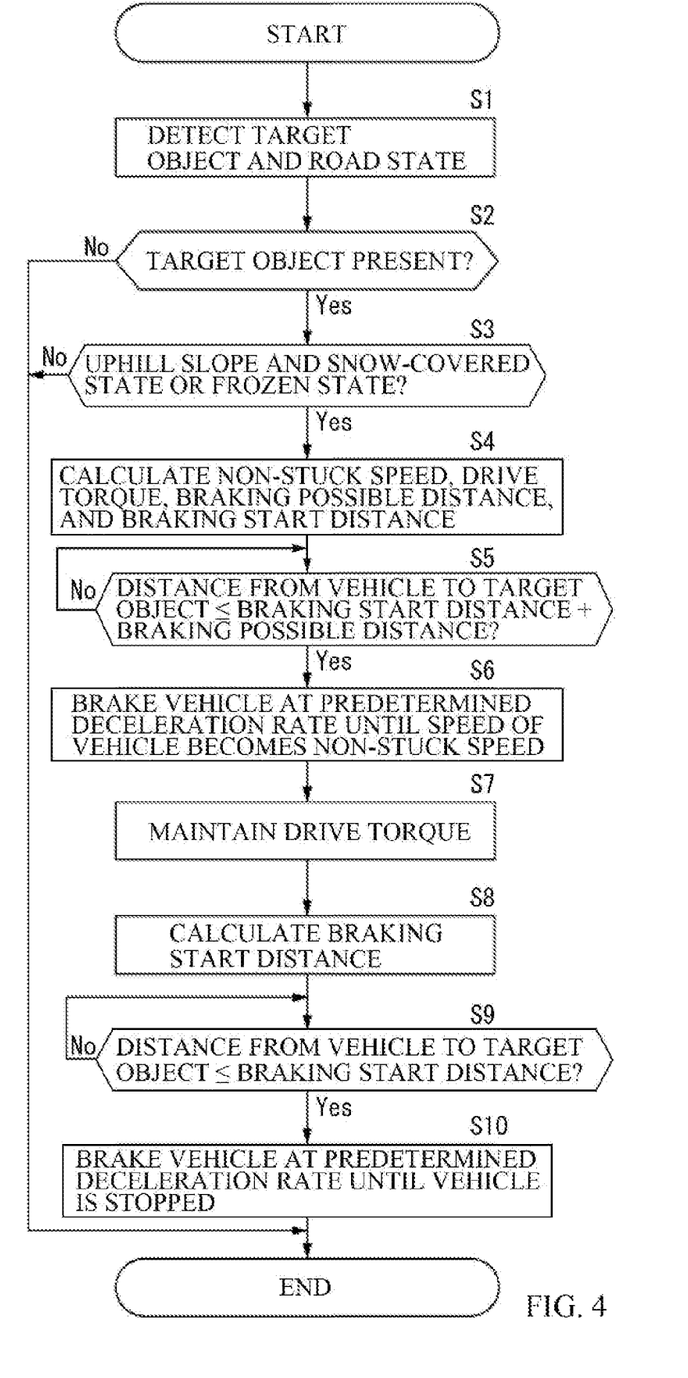
FIG. 4 is a flowchart illustrating an example of a flow of a process of the vehicle braking control according to one example embodiment.

FIG. 4 is a flowchart illustrating an example of a flow of a process of the vehicle braking control according to the example embodiment. Referring to FIG. 4, when the vehicle braking control is started, in step S1, the driving assist processor 5 may detect the target object 31 in front of the vehicle 100, and detect the road state in front of the vehicle 100.

In step S2, the driving assist processor 5 may determine whether the target object 31 is present in front of the vehicle 100. If the target object 31 is present (Yes in step S2), the driving assist processor 5 may determine whether a region in front of the vehicle 100 is the uphill slope and the road surface state in front of the vehicle 100 is the snow-covered state or the frozen state.

If the region in front of the vehicle 100 is the uphill slope and the road surface state is the snow-covered state or the frozen state (Yes in step S3), in step S4, the driving assist processor 5 may calculate the non-stuck speed V1, the drive torque Tq, the braking possible distance D1, and the braking start distance D0.

In step S5, the driving assist processor 5 may determine whether the distance D from the vehicle 100 to the target object 31 is equal to or less than the sum of the braking start distance D0 and the braking possible distance D1. If the distance D from the vehicle 100 to the target object 31 is not equal to or less than the sum of the braking start distance D0 and the braking possible distance D1 (No in step S5), the driving assist processor 5 may repeat a process of step S5.

If the distance D from the vehicle 100 to the target object 31 is equal to or less than the sum of the braking start distance D0 and the braking possible distance D1 (Yes in step S5), in step S6, the brake processor 9 may so control the brake 14 that the predetermined deceleration rate is achieved to brake the vehicle 100 until the speed of the vehicle 100 becomes the non-stuck speed V1.

In step S7, the drive processor 26 may so control the engine 12 and the transmission 13 that the torque to be outputted becomes the drive torque Tq.

In step S8, the driving assist processor 5 may calculate the braking start distance D2 that is necessary to cause the speed of the vehicle 100 to be 0 (zero) before the vehicle 100 comes into contact with the target object 31. In step S9, the driving assist processor 5 may determine whether the distance D from the vehicle 100 to the target object 31 is equal to or less than the braking start distance D2. If the distance D from the vehicle 100 to the target object 31 is not equal to or less than the braking start distance D2 (No in step S9), the driving assist processor 5 may repeat a process of step S8.

If the distance D from the vehicle 100 to the target object 31 is equal to or less than the braking start distance D2 (Yes in step S9), in step S10, the brake processor 9 may so control the brake 14 that the predetermined deceleration rate is achieved to brake the vehicle 100 until the vehicle 100 is stopped, and may end the vehicle braking control.

The vehicle braking control may be ended if the target object 31 is not present (No in step S2. The vehicle braking control may be ended if the region in front of the vehicle 100 is not the uphill slope, or the road surface state is not the snow-covered state or the frozen state (No in step S3).

If the predetermined operation is performed by the driver during execution of the processes from step S3 to step S10, the vehicle braking control may be halted.

It should be noted that the foregoing example embodiment is one example of implementing the disclosure. The disclosure is not limited to the above-described example, and various modification examples are conceivable. The disclosure encompasses such modification examples as some embodiments of the disclosure.

For example, the vehicle 100 having the engine 12 has been described in the foregoing example embodiment. In some embodiments, the vehicle 100 may be a hybrid vehicle driven by the engine 12 and a motor. In some embodiments, the vehicle 100 may be an electric vehicle driven by the motor.

In the foregoing example embodiment, the image processor 3, the driving assist processor 5, the display processor 6, the engine processor 7, the transmission processor 8, the brake processor 9, and the steering processor 10 may be configured by the different microcomputers from each other. In some embodiments, the image processor 3, the driving assist processor 5, the display processor 6, the engine processor 7, the transmission processor 8, the brake processor 9, and the steering processor 10 may be configured by one microcomputer. In some embodiments, one or a part of the image processor 3, the driving assist processor 5, the display processor 6, the engine processor 7, the transmission processor 8, the brake processor 9, and the steering processor 10 may be configured by one microcomputer.

In some embodiments, one or more of the image processor 3, the driving assist processor 5, the display processor 6, the engine processor 7, the transmission processor 8, the brake processor 9, and the steering processor 10 may be so configured that the driving assist processor 5 serves as the target object detector 21, the road state detector 22, the speed calculator 23, the torque calculator 24, the distance calculator 25, and the drive processor 26.

In the foregoing example embodiment, the target object 31 may be a three-dimensional object that can come into contact with the vehicle 100. In some embodiments, the target object 31 may be any object that the vehicle 100 is to be stopped, such as a red traffic light.

The vehicle control apparatus 1 according to the foregoing example embodiment is to be applied to the vehicle 100. The vehicle control apparatus 1 includes one or more processors. The one or more processors include: the target object detector 21 configured to detect the target object 31 in front of the vehicle 100; the road state detector 22 configured to detect the road state in front of the vehicle 100; the speed calculator 23 configured to calculate the non-stuck speed V1 at which the vehicle 100 does not become stuck on the road in front of the vehicle 100, when the target object 31 is detected by the target object detector 21, the road in front of the vehicle 100 detected by the road state detector 22 is the uphill slope, and the road surface of the road detected by the road state detector 22 satisfies a predetermined condition; and a braking processor configured to brake the vehicle 100 to the non-stuck speed V1. In one embodiment, the brake processor 9 may serve as the "braking processor".

Thus, the vehicle control apparatus 1 helps to maintain the vehicle 100 that travels on the uphill road in the snow-covered state or the frozen state at the non-stuck speed V1.

Accordingly, the vehicle control apparatus 1 helps reduce an occurrence of the spin out of the wheels when the vehicle 100 that travels on the uphill road in the snow-covered state or the frozen state accelerates.

Hence, the vehicle control apparatus 1 helps to reduce a situation in which the vehicle 100 becomes stuck as a result of braking the vehicle 100, even when the vehicle 100 is braked in order to prevent the vehicle 100 from coming into contact with the target object 31.

In some embodiments, the vehicle control apparatus 1 may further include the distance calculator 25 configured to calculate the braking possible distance D1 at which the vehicle 100 is stoppable by a predetermined operation to be performed the driver who drives the vehicle 100, and the braking processor may be configured to brake the vehicle 100 to the non-stuck speed V1, until the distance D from the vehicle 100 to the target object 31 satisfies the braking possible distance D1.

This configuration helps to prevent the vehicle 100 from coming into contact with the target object 31 without causing the vehicle 100 to become stuck by the driver's predetermined operation, if the driver notices that the vehicle 100 is likely to come into contact with the target object 31 when the vehicle 100 satisfies the non-stuck speed V1 at which the vehicle 100 does not become stuck.

In some embodiments, the vehicle control apparatus may further include: the torque calculator 24 configured to calculate the drive torque Tq, of the drive unit, that allows the vehicle 100 to maintain the non-stuck speed V1; and the drive processor 26 configured to maintain a torque to be outputted from the drive unit at the drive torque Tq, when the vehicle 100 satisfies the non-stuck speed V1. In one embodiment, the engine 12 and the transmission 13 may serve as the "drive unit".

This allows the non-stuck speed V1 to be maintained after the vehicle 100 is braked to the non-stuck speed V1 at which the vehicle 100 does not become stuck.

Accordingly, this configuration helps to accelerate the vehicle 100 without causing the vehicle 100 to become stuck even after the vehicle 100 has decelerated to the non-stuck speed V1.

In some embodiments, the drive processor 26 may be configured to end the maintenance of the drive torque Tq, when the driver who drives the vehicle 100 performs a predetermined operation.

This configuration helps to stop or accelerate the vehicle 100 with priority given to the driver's operation.

In some embodiments, the predetermined condition may include the road surface state of the road in front of the vehicle 100, and the road surface state may include the snow-covered state or the frozen state.

This configuration helps to suppress the vehicle 100 from becoming stuck, especially on the road surface that is in the snow-covered state or the frozen state.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

As used herein, the term "collision" may be used interchangeably with the term "contact".

One or more of the target object detector 21, the road state detector 22, the speed calculator 23, the torque calculator 24, the distance calculator 25, and the drive processor 26 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of one or more of the target object detector 21, the road state detector 22, the speed calculator 23, the torque calculator 24, the distance calculator 25, and the drive processor 26. Such a medium may take many forms, including, but not limited to, any type of magnetic medium such as a hard disk, any type of optical medium such as a CD and a DVD, any type of semiconductor memory (i.e., semiconductor circuit) such as a volatile memory and a nonvolatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of one or more of the target object detector 21, the road state detector 22, the speed calculator 23, the torque calculator 24, the distance calculator 25, and the drive processor 26 illustrated in FIG. 1.

The invention claimed is:

1. A vehicle control apparatus to be applied to a vehicle, the vehicle control apparatus comprising
one or more processors, wherein the one or more processors are configured to:
detect a target object in front of the vehicle;
detect a road state of a road in front of the vehicle;
calculate a non-stuck speed at which the vehicle does not become stuck on the road in front of the vehicle, when (i) the target object is detected, (ii) the road in front of the vehicle is detected to comprise an uphill slope, and a road surface of the road is detected to satisfy a predetermined condition;
calculate a braking possible distance at which the vehicle is stoppable by a predetermined operation to be performed by a driver who drives the vehicle; and
brake the vehicle to the non-stuck speed, until a distance from the vehicle to the target object satisfies the braking possible distance.

2. The vehicle control apparatus according to claim 1, the one or more processors are further configured to:
calculate a drive torque, of a drive unit of the vehicle, the drive torque allowing the vehicle to maintain the non-stuck speed; and
maintain a torque to be outputted from the drive unit at the drive torque, when the vehicle satisfies the non-stuck speed.

3. The vehicle control apparatus according to claim 2, wherein the one or more processors are further configured to end the maintenance of the drive torque, when a driver who drives the vehicle performs a predetermined operation.

4. The vehicle control apparatus according to claim 1, wherein
the predetermined condition comprises a road surface state of the road in front of the vehicle, and
the road surface state comprises at least one of a snow-covered state or a frozen state.

5. The vehicle control apparatus according to claim 1, wherein the one or more processors are further configured to:
calculate a braking start distance that allows a speed of the vehicle to decrease to zero before the vehicle comes into contact with the target object; and
brake the vehicle until the vehicle is stopped when the distance from the vehicle to the target object is equal to or less than the braking start distance.

* * * * *